United States Patent [19]

Haese et al.

[11] Patent Number: 5,410,014
[45] Date of Patent: Apr. 25, 1995

[54] METHOD OF PREPARING ALIPHATIC-AROMATIC POLYCARBONATES

[75] Inventors: Wilfried Haese, Odenthal; Ralf Pakull, Cologne; Gerhard Fennhoff, Willich; Jürgen Kirsch, Leverkusen, all of Germany

[73] Assignee: Bayer Aktiengesellschaft, Leverkusen, Germany

[21] Appl. No.: 169,470

[22] Filed: Dec. 17, 1993

[30] Foreign Application Priority Data

Dec. 24, 1992 [DE] Germany ............ 42 44 008.4

[51] Int. Cl.$^6$ ............................................. C08G 64/00
[52] U.S. Cl. .................................... 528/196; 528/198
[58] Field of Search .............................. 528/196, 198

[56] References Cited

U.S. PATENT DOCUMENTS

| | | | |
|---|---|---|---|
| 2,964,797 | 12/1960 | Peilstöcker et al. | 18/57 |
| 3,069,385 | 12/1962 | Stevens | 528/196 |
| 3,136,741 | 6/1964 | Schnell et al. | 528/196 |
| 3,161,615 | 12/1964 | Goldberg | 528/196 |
| 3,784,595 | 1/1974 | Schirmer et al. | 528/198 |
| 4,281,101 | 7/1981 | Schreckenberg et al. | 528/196 |
| 4,638,077 | 1/1987 | Brunelle et al. | 558/281 |
| 4,910,283 | 3/1990 | Kawaki et al. | 528/201 |
| 5,162,564 | 11/1992 | Silva et al. | 558/268 |

FOREIGN PATENT DOCUMENTS

| | | |
|---|---|---|
| 1149261 | 12/1957 | France . |
| 971777 | 3/1959 | Germany . |
| 1162559 | 2/1964 | Germany . |
| 1212983 | 3/1966 | Germany . |
| 2447349 | 4/1976 | Germany . |
| 2619831 | 11/1977 | Germany . |
| 2636784 | 2/1978 | Germany . |
| 63-227627 | 9/1988 | Japan . |
| 808485 | 2/1959 | United Kingdom . |

OTHER PUBLICATIONS

Schnell, Chemistry & Physics of Polycarbonates, 1964, Interscience Publishers, New York—London—Sydney, pp. 55–58.

Primary Examiner—John Kight, III
Assistant Examiner—Terressa M. Mosley
Attorney, Agent, or Firm—Joseph C. Gil; Aron Preis

[57] ABSTRACT

A method of preparing aliphatic-aromatic polycarbonate resin is disclosed. Accordingly, the method entails reacting an oligocarbonate of diphenol having chlorocarbonic acid ester terminal groups, with an aliphatic diol, in a non-aqueous solvent. The amount of solvent is such that the oligocarbonate is about 10–40% relative to the total weight of solvent, oligocarbonate and diol.

7 Claims, No Drawings

METHOD OF PREPARING ALIPHATIC-AROMATIC POLYCARBONATES

BACKGROUND OF THE INVENTION

The invention relates to the preparation of polycarbonate resins and more particularly to a process entailing reacting an oligocarbonate diphenol having chlorocarbonic acid ester terminal group with an aliphatic diol.

The present invention relates to a method of preparing aliphatic-aromatic polycarbonates in non-aqueous solution, which is characterized in that oligocarbonates of diphenols with chlorocarbonic acid ester terminal groups are reacted with aliphatic diols in non-aqueous, neutral solvents with cleavage of hydrogen chloride, optionally in the presence of catalysts. The molar ratio of oligocarbonate to diol is preferably stoichiometric, i.e. one OH group is reacted per chlorocarbonic acid group.

Monophenols may optionally be added as chain terminators in amounts from 0.5 mole % to 10 mole %, preferably from 1.5 mole % to 8 mole % based on the total carbonate groups.

When chain terminators are used, the usual branching agents for aromatic polycarbonates may be used in addition, namely, trisphenols, tetraphenols, etc., in particular, in amounts from 0.05 mole % to 2 mole % based on the total carbonate groups. Aliphatic polyhydric alcohols with 3, 4, 5, 6 or more aliphatic OH groups are also suitable branching agents.

The addition of branching agents without the simultaneous addition of chain terminators leads to cross-linked products which are undesirable in the present context.

The reaction of bischlorocarbonic acid esters of diphenols with aliphatic diols is known (see, for example, DE-PS 971,777 (Ue1692), GB-808,485, U.S. Pat. No. 3,136,741, and Schnell, Chemistry and Physics of Polycarbonates, 1964, Interscience Publishers, New York, London, Sydney, pages 55–58, particularly page 57). However, the use of chlorocarbonic acid esters of aromatic oligocarbonates is not mentioned in the above referenced documents.

Packaging films comprising polycarbonates are known from U.S. Pat. No. 2,964,797 (Ue1752); these may be synthesized from diphenols and aromatic diols (see column 1, lines 64–68 and column 3, lines 35–38 of U.S. Pat. No. 2,964,797). Bischlorocarbonic acid esters of dihydroxy compounds may also be used for the preparation of polycarbonates, the reaction being conducted in inert solvents and in the presence of media which react with acids, such as tertiary amines (column 5, lines 30–35 of U.S. Pat. No. 2,964,797). The above document makes no mention of the use of chlorocarbonic acid esters of aromatic oligocarbonates.

U.S. Pat. No. 3,161,615 describes polycarbonates of diphenols and aliphatic diols. Both random and block copolymers are described (column 1, lines 40–57 of the above-mentioned U.S. Patent). However, U.S. Pat. No. 3,161,615 contains no description of the subject of the present invention.

U.S. Pat. No. 3,069,385 describes the chain lengthening of aliphatic aromatic polycarbonates with phosgene. This U.S. patent contains no description of the subject of the present invention.

Mixed block polycondensation products are known from DE-AS 1,162,559, and are prepared from polycarbonate blocks containing OH groups and from bis-chloroformic acid esters of polyalkylene ether glycols or polyolefines, for example.

DE-OS 2,064,095 (LeA 13,461) mentions that glycols can be used as reaction additives in the preparation of aromatic polycarbonates from diphenols (pages 3 and 4 of DE-OS 2,064,095). The use of chlorocarbonic acid esters of aromatic oligocarbonates is not mentioned in this patent.

It is known from DE-OS 2,447,349 (LeA 16,012) that aliphatic diols can be reacted with bischlorocarbonic acid esters of diphenols to form polycarbonates (see also Houben-Weyl, Volume E20/II, pages 1443–1457, particularly page 1447). The use of chlorocarbonic acid esters of aromatic oligocarbonates is not mentioned in this patent.

DE-OS 2,619,831 (LeA 16,933) teaches that the reaction of polyhydric alcohols with chlorocarbonic acid esters of phenols in the presence of media reactive with hydrogen chloride has disadvantages (page 2 of this document). A special transesterification process is, therefore, preferred.

According to DE-OS 2,636,784 (LeA 17,025), the preparation of polyether polycarbonates is effected by first converting the polyalkylene oxide diols into bis-diphenol carbonates, so that they contain phenolic terminal groups which are subsequently polycondensed with other diphenols by the known phase boundary process. It is emphasized that the use of bischloroformic acid esters of polyalkylene oxide diols involves disadvantages (page 24, paragraph 3 of DE-OS 2,636,784).

The preparation of aliphatic-aromatic polycarbonates is known from DE-OS 2,827,325 (LeA 18,819); this preparation again proceeds via the bis-diphenol carbonate intermediate stage. This document also mentions (page 17, penultimate paragraph of DE-OS 2,827,325) that the use of bischloroformic acid esters is disadvantageous.

Accordingly, it was surprising that the method according to the invention, with the use of bischlorocarbonic acid esters of aromatic oligocarbonates, leads to aliphatic-aromatic polycarbonates of good quality and in good yield.

The bischlorocarbonic acid esters of aromatic oligocarbonates used according to the invention are known from the literature (see DE-AS 1,212,983, for example), and can be obtained by methods which are known from the literature (see EP 263,432, for example).

They preferably correspond to the formula (I)

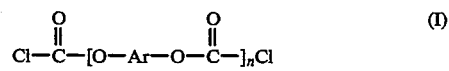

where n represents the mean value of a distribution and has a value from 4 to 20, preferably from 5 to 10, most preferably from 6 to 8, and where —O—Ar—O is a diphenolate radical with 6 to 30 C atoms, which may be mononuclear or polynuclear and if polynuclear may be linked by bridging elements such as alkylene radicals, alkylidene radicals, cycloalkylidene radicals, —CO-sulphide, oxide or sulphone, or by a single bond, for example, and may contain alkyl, chloro or bromo substituents. Preferred diphenols

are those corresponding to formula (III)

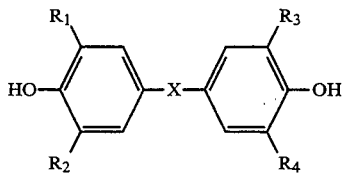

where X is a $C_1$–$C_8$ alkylene, a $C_2$–$C_8$ alkylidene, a $C_5$–$C_{10}$ cycloalkylidene, —S— or a single bond, and where $R_1$ to $R_4$ may be the same or different and may represent $CH_3$, Cl, Br or H.

Suitable diphenols comprise hydroquinone, resorcinol, dihydroxydiphenyls, bis-(hydroxyphenyl)-alkanes, bis(hydroxyphenol)-cycloalkanes, bis(hydroxyphenyl)-sulphides, bis-(hydroxyphenyl)-ethers, bis-(hydroxyphenyl )-ketones, bis-(hydroxyphenyl)-sulphones, α,α'-bis-(hydroxyphenyl )diisopropylbenzenes, and their compounds with alkylated and halogenated nuclei, for example.

Preferred diphenols comprise 4,4'-dihydroxydiphenyl, 2,2-bis-(4-hydroxyphenyl)-propane, 2,4-bis-(4-hydroxyphenyl)-2-methylbutane, 2,2-bis-(3-methyl-4-hydroxyphenyl)-propane, 2,2-bis(3-chloro-4-hydroxyphenyl)-propane, bis-(3,3-dimethyl-4-hydroxyphenyl)-methane, 2,2-bis-(3,5-dimethyl -4-hydroxyphenyl)-propane, 2,4-bis-(3,5-dimethyl -4-hydroxyphenyl)-2-methylbutane, 2,2-bis-(3,5-dichloro-4-hydroxyphenyl)-propane, 2,2-bis-(3,5-dibromo-4-hydroxyphenyl) propane, 1,1-bis-(4-hydroxyphenyl)-3,3,5-trimethylcyclohexane and 1,1-bis-(4-hydroxyphenyl)-cyclohexane, for example.

Particularly preferred diphenols comprise 2,2-bis-(4-hydroxyphenyl)-propane, 2,2-bis-(3,5-dimethyl-4-hydroxyphenyl)-propane, 2,2-bis-(3,5-dichloro-4-hydroxyphenyl)-propane, 2,2-bis-(3,5-dibromo-4-hydroxyphenyl)-propane, 1,1-bis-(4-hydroxyphenyl)-cyclohexane, and 1,1-bis-(4-hydroxyphenyl)-3,3,5-trimethylcyclohexane, for example.

The oligocarbonates (I) may contain —Ar radicals which are either the same or different, and may also be based on the same or different diphenols HO—Ar—OH (II).

Preferred aliphatic diols are those with 2 to 50 C atoms, particularly preferred diols contain 2 to 20 C atoms, and the most particularly preferred diols contain 2 to 18 C atoms; the alkylene radicals of the diols may be linear or branched, and the diols may contain ether and/or thioether bridges. The OH substituents of the diols may be in the α, β or α, γ to α, ω positions. Diols with α,ω OH groups are preferred.

The alkylene radicals of the aliphatic diphenols may additionally contain arylene radicals or cycloalkylene radicals, preferred arylene radicals comprising 1,4-phenylene or 1,3-phenylene radicals, and preferred cycloalkylene radicals comprising 1,4-cyclohexylene radicals.

Aliphatic diols which are suitable according to the invention also comprise cycloaliphatic diols, preferably with 5 to 10 C atoms, such as 1,4-cyclohexanediol, for example.

Examples of diols which may be used according to the invention include ethylene glycol, 1,2-propylene glycol, 1,3-propylene glycol, 1,4-butylene glycol, 1,3-butylene glycol, 2,3-butylene glycol, 1,6-hexanediol, 1,8-octanediol, 1,10-decanediol, 1,12-dodecanediol, neopentyl glycol, cyclohexane diol, 1,4-bis-(hydroxymethyl)-cyclohexane, 2-methyl-1,3-propanediol, 2,2,4-trimethyl-1,3-pentanediol, diethylene glycol, thiodiglycol, triethylene glycol and tetraethylene glycol, and also polyethylene glycols, dipropylene glycols, polypropylene glycols, dibutylene glycol and polybutylene glycols. Preferred diols comprise ethylene glycol, 1,2-propylene glycol, 1,3-propylene glycol, 1,4-butylene glycol, 1,3-butylene glycol, 2,3-butylene glycol and 1,6-hexanediol.

Non-aqueous solvents which are suitable according to the invention comprise chlorinated hydrocarbons such as methylene chloride or chlorobenzene, aromatic hydrocarbons such as toluene or mesitylene, acetone or acetonitrile, or mixtures of these solvents, for example. The solvents are used in an amount such that the resulting reaction mixture contains 10–40% of oligocarbonate.

Catalysts which are suitable according to the invention are preferably tertiary aliphatic amines and nitrogen heterocycles. Examples include trimethyl amine, triethylamine, tripropylamine, tributylamine, and also pyridine, quinoline, isoquinoline, picoline, acridine, pyrazine, pyridazine, pyrimidine, oxazine, thiazine, benzimidazole or imidazole. Apart from the free bases the corresponding acid-addition salts may also be used, i.e. for example the trimethylammonium hydrochloride or the pyridine hydrogen sulphate. The catalysts are used in amounts from 0.5–5% based on the oligocarbonate.

The preferred embodiment of this method employs catalysts having a boiling point equal to or higher than that of the solvent used.

Suitable chain terminators comprise phenol, $C_{1-10}$ alkylphenols such as p-tert.-butylphenol or p-iso-octylphenol, chlorophenols and bromophenols, for example.

Suitable branching agents are those cited in EP 480,237, for example.

The hydrochloric acid produced during the reaction is expelled from the reaction mixture in gaseous form.

The polycarbonates obtained according to the invention are isolated from the non-aqueous organic solution in the known manner, by washing the mixture until it is neutral and free from electrolytes, possibly after dilution with additional organic solvent, followed, for example, by isolation as a granular material using an evaporation extruder or by precipitation of the polycarbonate from organic solution followed by further isolation.

The polycarbonates obtained by the method according to the invention have molecular weights $M_w$ (weight average molecular weight; determined by gel chromatography after prior calibration) of 9000 to 190,000, preferably 19,000 to 65,000.

They exhibit a good overall spectrum of properties, namely good flowability in combination with toughness.

The polycarbonates obtainable according to the invention may be processed very satisfactorily to produce any desired molding on the usual machines, for example, extruders, injection-molding machines, etc., at temperatures of 250° C. to 350° C., preferably from 260° C. to 300° C., so that even complicated moldings can be manufactured with a high degree of dimensional accuracy. Dimensionally accurate moldings of this type are used in the electronics industry for example, and are used in particular in aircraft construction and in space travel.

The usual additives for aromatic polycarbonates, such as stabilizers, flow promoters, plasticizers, demolding agents, fillers, reinforcing agents such as glass fibers, glass spheres, carbon fibers, kieselguhr, kaolin, powdered minerals and pigments may be incorporated in the usual manner in the polycarbonates obtainable according to the invention. Processing to form the desired moldings may be effected at the same time as or after the additives are incorporated.

The invention is further illustrated but is not intended to be limited by the following examples in which all parts and percentages are by weight unless otherwise specified.

EXAMPLES

The oligocarbonate used in the following examples was based on bisphenol A and is characterized as follows:

| | |
|---|---|
| $\eta$rel | 1.077 |
| $M_w$: | 3500 |
| phenolic OH: | 0.054–0.057% |
| saponifiable chlorine: | 4.7% |

Example 1

The following reactants were weighed into a 1 l three-necked flask fitted with a stirrer, gas inlet and outlet and a reflux condenser:

150 g of the above oligocarbonate
11.3 g 1,6-hexanediol
460 g mesitylene and
2.1 ml tributylamine.

The reaction mixture was heated to 160°–170° C. and maintained at this temperature for 8 hours with stirring. After cooling, the product was washed several times with isopropanol and then dried. An aromatic-aliphatic polycarbonate was obtained, with a relative solution viscosity of 1.278. The glass temperature was 111° C. The material had an average molecular weight ($M_w$) of 26,800 (gel permeation chromatography)

Example 2

The following reactants were weighed into a 500 ml three-necked flask fitted with a stirrer, gas inlet and outlet and a reflux condenser:

25 g of the above oligocarbonate
1.44 g 1,4-butanediol
77 g mesitylene and
0.35 ml tributylamine.

The reaction mixture was heated to about 160° C. and maintained at this temperature for 8 hours with stirring. After cooling, the product was washed several times with isopropanol and then dried. An aromatic-aliphatic polycarbonate was obtained, with a relative solution viscosity of 1.245. The glass temperature was 119° C.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A method of preparing aliphatic-aromatic polycarbonate resin having a weight average molecular weight of 9,000 to 190,000 comprising
   (a) reacting at a temperature of 160° to 170° C. in the presence of a catalyst
      (i) an oligocarbonate of diphenol having chlorocarbonic acid ester terminal groups, with
      (ii) an aliphatic diol,
   in a non-aqueous neutral solvent, said solvent being in an amount such that said oligocarbonate is present in an amount of about 10–40% relative to the total weight of the mixture of said solvent, (i) and (ii) and
   (b) expelling from said mixture gaseous hydrochloric acid formed in the reaction, and
   (c) isolating a the resulting polycarbonate from said non-aqueous solvent said catalyst selected from the group consisting of tertiary aliphatic amines and nitrogen heterocycle, said catalyst being present in an amount of 0.5 to 5 percent relative to the weight of said oligocarbonate, said solvent being at least one member selected from the group consisting of chlorinated hydrocarbons and aromatic hydrocarbons, said molecular weight being determined by gel chromatography.

2. The method of claim 1, wherein oligocarbonate conforms to

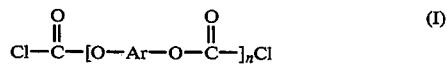

wherein —O—AR—O— denotes a diphenolate radical having 6 to 30 carbon atoms and n is the mean value of a distribution and represents a value from 4 to 20.

3. The method of claim 1 wherein aliphatic diol contains 2 to 50 carbon atoms.

4. The method of claim 3 wherein aliphatic diol contains 2 to 18 carbon atoms.

5. The method of claim 1 wherein non-aqueous solvent is at least one member selected from the group consisting of chlorinated and aromatic hydrocarbons.

6. The method of claim 5 wherein said solvent is selected from the group consisting of methylene chloride chlorobenzene, toluene, mesitylene, acetone and acetonitrile.

7. The method of claim 2 wherein said n is 6 to 8 and wherein said diphenolate radical is derived from a diphenol selected from the group consisting of hydroquinone, resorcinol, dihydroxydiphenyls, bis-(hydroxyphenyl)-alkanes, bis(hydroxyphenol)-cycloalkanes, bis(-hydroxyphenyl)sulphides, bis-(hydroxyphenyl)-ethers, bis-(hydroxyphenyl)-ketones, bis(hydroxyphenyl)-sulphones and α-α'-bis-(hydroxyphenyl)diisopropylbenzenes.

* * * * *